United States Patent [19]

Vassiliou et al.

[11] Patent Number: 5,236,812
[45] Date of Patent: Aug. 17, 1993

[54] SOLID IMAGING METHOD AND APPARATUS

[75] Inventors: Eustathios Vassiliou, Newark; Bruce A. Chamberlin, Wilmington, both of Del.; John A. Lawton, Landenberg, Pa.

[73] Assignee: E. I. Du Pont de Nemours and Company, Wilmington, Del.

[21] Appl. No.: 636,869

[22] Filed: Jan. 2, 1991

Related U.S. Application Data

[63] Continuation-in-part of Ser. No. 460,433, Dec. 29, 1989, abandoned.

[51] Int. Cl.[5] .............................................. B05D 3/06
[52] U.S. Cl. .................................... 430/327; 430/269; 430/320; 430/394; 430/935
[58] Field of Search .............. 430/269, 320, 394, 396, 430/327, 331, 945, 935; 156/58, 59; 264/22

[56] References Cited

U.S. PATENT DOCUMENTS

| | | | |
|---|---|---|---|
| 2,775,758 | 12/1956 | Munz | 343/17 |
| 4,575,330 | 3/1986 | Hull | 425/174.4 |
| 4,752,498 | 6/1988 | Fudim | 427/54.1 |
| 4,960,674 | 10/1990 | Fudim et al. | 430/284 |
| 5,006,364 | 4/1991 | Fan | 430/269 |

FOREIGN PATENT DOCUMENTS 0250121 2/1987 European Pat. Off. .

OTHER PUBLICATIONS

Hideo Kodama, "Automatic Method for fabricating a three-dimensional plastic model with photo-hardening polymer", 1981, pp. 1770–1773.
Alan J. Herbert, "Solid Object Generation", 1982, pp. 185–188.
A. J. Herbert, "A Review of 3D Solid Object Generation", 1989, pp. 186–190.

Primary Examiner—Charles L. Bowers, Jr.
Assistant Examiner—Thorl Chea
Attorney, Agent, or Firm—Thomas H. Magee

[57] ABSTRACT

An apparatus and method for fabricating integral three-dimensional objects from contiguous layers of a photosensitive composition in an imagewise manner, with an additional photogelled portion or photohardened wall, or both, surrounding the three-dimensional object.

20 Claims, 9 Drawing Sheets

SOLID IMAGING METHOD AND APPARATUS

CROSS REFERENCE TO RELATED APPLICATION

This is a continuation-in-part of application Ser. No. 07/460,433 filed Dec. 29, 1989, now abandoned

1. Field of the Invention

This invention relates to production of three-dimensional objects by photohardening contiguous layers of a photosensitive composition in an imagewise manner, and in particular with an additional photogelled portion or photohardened wall, or both surrounding the three-dimensional object.

2. Background of the Invention

Many systems for production of three-dimensional modeling by photohardening have been proposed. European Patent Application No. 250,121 filed by Scitex Corporation Ltd., on Jun. 6, 1987, which discloses a three-dimensional modeling apparatus using a solidifiable liquid, and provides a good summary of documents pertinent to this art. U.S. Pat. No. 4,575,330 (C. W. Hull), issued on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process. U.S. Pat. No. 4,752,498 (E. V. Fudim), issued on Jun. 21, 1988, describes an improved method of forming three-dimensional objects, which comprises irradiating an uncured photopolymer by transmitting an effective amount of photopolymer solidifying radiation through a radiation transmitting material which is in contact with the uncured photopolymer. The transmitting material is a material which does not interfere with the solidified photopolymer's ability to subsequently crosslink. Using this method, multilayer objects can be made.

Publication "Automatic Method for fabricating a three-dimensional plastic model with photohardening polymer" by Hideo Kodama, Rev. Sci. Instrum. 52(11), 1770–1773, Nov. 1981, describes a method for automatic fabrication of a three-dimensional plastic model. The solid model is fabricated by exposing liquid photohardenable polymer to ultraviolet rays, and stacking the cross-sectional solidified layers. Publication "Solid Object Generation" by Alan J. Herbert, Journal of Applied Photographic Engineering, 8(4), 185–188, Aug. 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory.

A good review of the different methods is also given by a more recent publication, titled "A Review of 3D Solid Object Generation" by A. J. Herbert, Journal of Imaging Technology 15: 186–190 (1989).

Most of these approaches relate to the formation of solid sectors of three-dimensional objects in steps by sequential irradiation of areas or volumes sought to be solidified. Various masking techniques are described as well as the use of direct laser writing, i.e., exposing a photohardenable composition with a laser beam according to a desired pattern and building a three-dimensional model layer by layer. In addition to various exposure techniques, several methods of creating thin liquid layers are described which allow both coating a platform initially and coating successive layers previously exposed and solidified.

Current methods of coating suggested thus far, however, have drawbacks in that they are not capable of ensuring flat uniform layer thickness or of producing such layers quickly, or they do not effectively prevent damage or distortion to previously formed layers during the successive coating process. Furthermore, they omit to recognize very important parameters involved in the coating process such as the effects of having both solid and liquid regions present during the formation of the thin liquid layers, the effects of fluid flow and rheological characteristics of the liquid, the tendency for thin photohardened layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example describes a dipping process where a platform is lowered either one layer thickness or is dipped below the distance of one layer in a vat then brought up to within one layer thickness of the surface of the photohardenable liquid. Hull further suggests that low viscosity liquids are preferable, but for other practical reasons, the photohardenable liquids are generally high viscosity liquids. Although theoretically most liquids will flatten out eventually, high viscosity liquids and even low viscosity liquids take an inordinate amount of time to flatten to an acceptable degree especially if large flat areas are being imaged and if the liquid layer thickness is very thin. Regions where previous layers consist of solid walls surrounding liquid pools further compounds the flattening process of the thin liquid layer coating. In addition, motion of the platform and parts, which have cantilevered or beam (regions unsupported in the Z direction by previous layer sections), within the liquid creates deflections in the layers, contributing to a lack of tolerance in the finished part.

The Munz patent (U.S. Pat. No. 2,775,758, issued in 1956) and Scitex application describe methods by which the photohardenable liquid is introduced into the vat by means of a pump or similar apparatus such that the new liquid level surface forms in one layer thickness over the previously exposed layers. Such methods have all the problems of the Hull methods except that the deflections of the layers during coating is reduced.

The Fudim patent describes the use of a transmitting material, usually rigid and coated or inherently unlikely to adhere to the solidified photopolymer, to fix the surface of the photopolymer liquid to a desired shape, assumably flat, through which photopolymers of desired thickness are solidified. The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds and the like are still present and in some cases substantial enough to cause damage or distortion to the photopolymer during removal from the transmitting material surface. Furthermore, it is believed that forces resisting the separation or even sliding off the solidified layer having been exposed in intimate contact with the suitably non-adhesive transmitting material, are capable of damaging the solidified layer, especially when surrounded by photohardenable liquid and even more especially when the solidified layers are thin. No method is described in the Fudim patent to eliminate these problems.

A serious disadvantage of the dipping processes is that the exposure takes place in an area being part of the huge surface of the photohardenable composition limited only by the dimensions of the vessel containing the composition. Thus, the leveling process for a layer to assume uniform thickness takes an unnecessarily long time.

Another serious disadvantage of the aforementioned methods is that every single portion of each photohardened layer has to be at least partially supported by either the substrate on which the object is being formed or by another layer. This is limiting considerably the freedom of selecting the orientation, parallel to which the layers have to be formed, and also, in a number of cases, it limits the design of the object itself.

It is an object of the present invention to provide a method lacking these disadvantages and produce three-dimensional objects of highly improved quality and complexity at a faster rate.

In a recently issued U.S. Patent by Scitex Corporation Ltd., U.S. Pat. No. 4,961,154 (Pomerantz et al.), there is disclosed an apparatus employing a method of supporting an object, being fabricated layer by layer, wherein a second non-photosensitive liquid is supplied to both support the object layers and control the depth of photo-solidification of the individual layers. This non-photosensitive liquid may be a heated wax which presumably cools to a solid after application. The patent by Scitex may be distinguished, from the invention described herein, in that this disclosure does not utilize a second non-reactive material to provide supports, does utilize a gap or reduction in exposure between the photohardened or gelled support region and the photohardened object, does not require the removal of photohardenable composition which has not been exposed during each layer forming step, and does not require the melting out of non-reactive material once all object layers have been fabricated.

European Patent Application Publication No. 0338751 (Hull and Lewis) 3-D Systems, Inc. discloses a stereolithography method wherein supports, such as webs, columns, and beams are added to the CAD file in order to facilitate part fabrication and improve fabricated part tolerances. During the process, the supports are attached firmly to the object being fabricated and anchored to the platform on which the object is being manufactured. The art described, by the above patent application, may be distinguished, from the invention disclosed herein, in that this disclosure does not require the attachment of the support region to the object under fabrication and therefore does not require the cutting away of the support after fabrication, does not require one to perform a structural analysis of the supported layer in order to design and place the supports properly, does not require the full photoformation of the supporting region, and does allow for an improved coating of the layers.

In another recently issued patent by Dow Corning Corporation, U.S. Pat. No. 4,961,886 (Eckstein and Lutz), a method of forming a dam to contain flowable radiation curable material is disclosed. While the formation of such a dam is similar to that disclosed in the instant invention wherein a wall is formed to enclose a gel and object, there is no indication in the Dow patent that multilayer applications of this flowable radiation curable materials are to be pursued, and the method disclosed does not lend itself to the fabrication of three-dimensional objects.

Preferably, the solidified layers according to this invention have a thickness of less than 0.030" and are flat to within 0.001" per inch.

SUMMARY OF THE INVENTION

The instant invention is directed to a method for fabricating an integral three-dimensional object from a multiplicity of cross sectional portions of the object, the cross sectional portions corresponding to photohardened portions of contiguous layers of a photogellable and photohardenable liquid composition, comprising the steps of:

(a) forming a layer of the photohardenable liquid composition;

(b) providing a first exposure to the layer, adequate to produce a soft gelled area, the soft gelled area surrounding a respective cross sectional portion of the object;

(c) providing imagewise a second exposure to the cross sectional portion of the object, adequate to imagewise photoharden said portion;

(d) introducing a new layer of photohardenable liquid composition onto the layer subjected to steps (b) and (c);

(e) repeating steps (b) to (d) until all layers of the three dimensional object have been photohardened and all soft gelled areas have formed a soft gelled mass surrounding the three dimensional object, the object being separated from the gelled mass by an interface; and (f) removing the soft gelled mass in order to recover the three dimensional object.

Preferably, the method further comprises the step of providing a third exposure to the periphery of the gelled area, after step (a) and before step (d), the third exposure being adequate to photoharden a complete sector of a circumferencial wall, the wall being built to contain the gelled area.

Another embodiment of the invention provides a method for fabricating an integral three-dimensional object from a multiplicity of cross sectional portions of the object, the cross sectional portions corresponding to photohardened portions of contiguous layers of a photohardenable liquid composition, comprising the steps of:

(a) forming a layer of the photohardenable liquid composition;

(b) forming a complete sector of a peripheral wall of photohardened composition around the respective cross sectional portion of the three-dimensional object by exposing said complete sector of the peripheral wall to radiation;

(c) providing imagewise an exposure to the cross sectional portion of the object, adequate to imagewise photoharden said cross sectional portion;

(d) introducing a new layer of photohardenable liquid composition onto the layer subjected to steps (b) and (c); and (e) repeating steps (b) to (d) until all layers of the three dimensional object and all sectors of the peripheral wall have been photohardened.

The instant invention also provides an apparatus for accurately fabricating an integral three-dimensional rigid object from contiguous layers of a liquid photohardenable composition comprising:

imaging means for selectively exposing to radiation each of the contiguous layers of the photohardenable composition, the imaging means including at least two exposure elements, a second element for exposing crosssectional portions of the contiguous layers corresponding to the three dimensional object, and a first element for exposing areas including said crosssectional portions; and a coating station comprising
a vessel for collecting the liquid photohardenable composition, a substantially flat platform within the vessel for supporting the rigid object,
a dispenser above the platform for dispensing the photohardenable composition in the form of layers, and
means for recirculating the photohardenable composition from the vessel to the dispenser.

Still another embodiment of the invention provides a method for fabricating an integral three-dimensional object from a multiplicity of cross sectional portions corresponding to photohardened portions of contiguous layers of a photohardenable liquid composition, comprising the steps of:

(a) containing a photohardenable composition, having a surface, in a vat;

(b) positioning a platform one layer's thickness beneath the surface;

(c) coating a substantially uniform layer of the composition on the platform;

(d) exposing the layer to imagewise radiation, said exposure adapted to photoharden the layer imagewise in order to create an object portion, said portion representing a cross-section of the object, a support region segment, said segment representing a cross-section of the support region, and a gap separating the object portion from the support segment;

(e) positioning the platform and the exposed layer one layer's thickness beneath the surface;

(f) coating a new substantially uniform layer of the composition on the previous layer;

(g) exposing the new layer to imagewise radiation, said exposure adapted to photoharden the layer imagewise in order to create an object portion, said portion representing a cross-section of the object, a support region segment, said segment representing a cross-section of the support region, and a gap separating the object portion from the support segment; and, (h) repeating steps (e) through (g) until all layers of the three-dimensional object and all layers of the support region have been photohardened with the gap separating the object from the support region.

DESCRIPTION OF THE DRAWING

The reader's understanding of practical implementations of preferred embodiments of the invention will be enhanced by reference to the following detailed description taken in conjunction with perusal of the drawing figures, wherein.

DETAILED DESCRIPTION OF THE INVENTION

Figure 1:
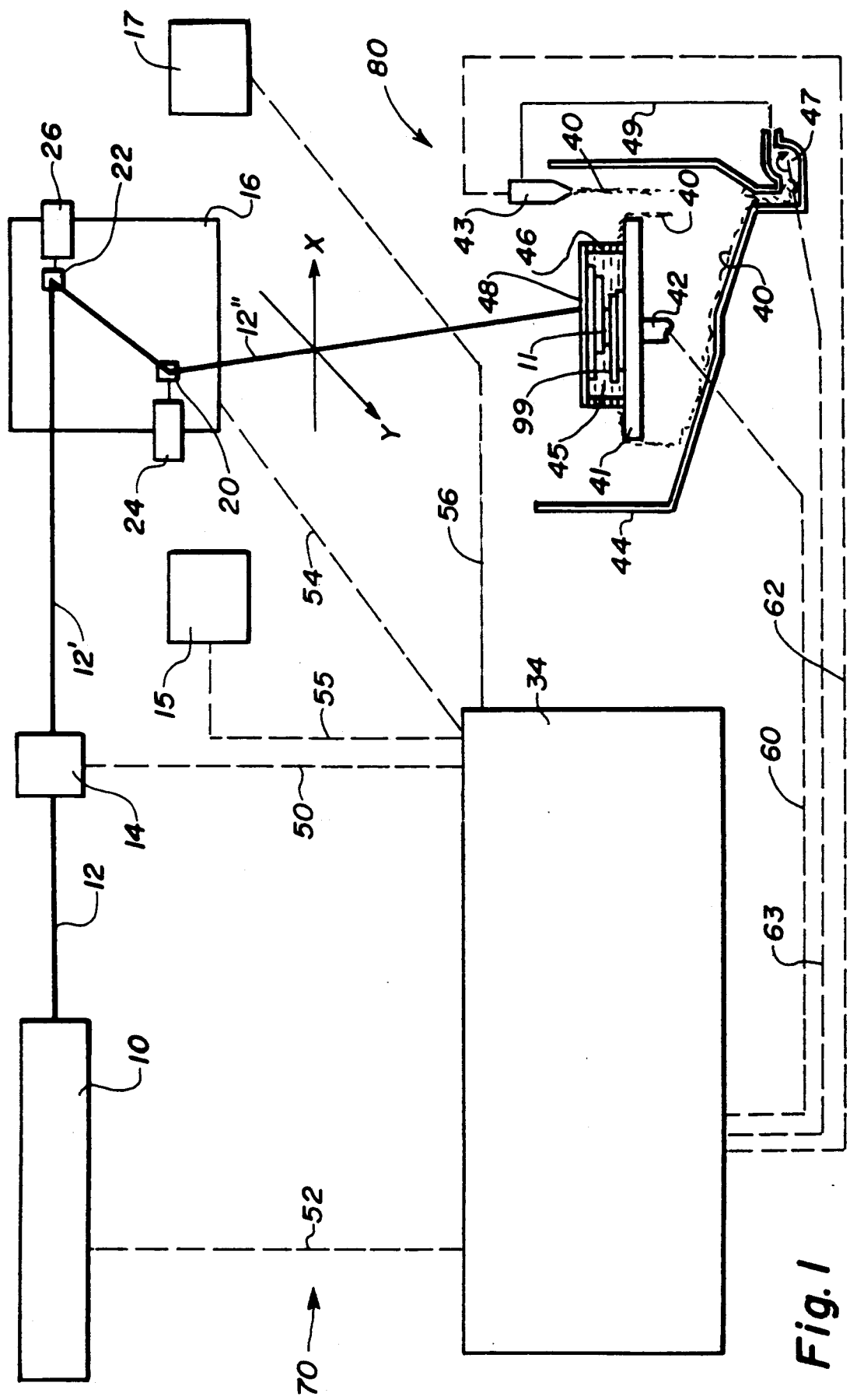
FIG. 1 is a schematic diagram showing the apparatus utilized in the practice of a preferred embodiment of the instant invention.

The instant invention is directed to a method of fabricating an integral three-dimensional object from a multiplicity of cross sectional portions of the object, the cross sectional portions corresponding to photohardened portions of contiguous layers of a photohardenable and preferably also photogellable liquid composition.

In the context of this discussion, photogellable composition is defined as one for which there is an exposure level and exposure wavelength of actinic radiation capable of transforming the liquid composition to a loosely polymerized and/or cross linked soft gel, also herein referred to as simply "gel" for purposes of brevity. On the other hand, photohardenable composition is defined as one for which there is an exposure level and an exposure wavelength of actinic radiation capable of transforming the liquid or the soft gelled composition to a solid well polymerized and/or cross linked structure. It is important to note that the same effect may be produced by different mechanisms. For example, a soft gel may be produced either by the low availability of polymerizable or cross linkable bonds at a certain wavelength range, regardless of the exposure level above a certain limit at the wavelengths under consideration, or it may be produced by a low level of exposure in an abundance of polymerizable and/or cross linkable bonds at a certain wavelength range. In the former case, if it is desirable to render the composition also photohardenable, the composition may be formulated to contain an adequate amount of polymerizable or cross linkable bonds at a different range of wavelengths. Examples of ways to achieve this would be selection of the type of the bonds, selection of different initiators in type and amount, or even selection of completely different mechanisms of polymerization or cross linking. In the latter case, the composition may be considered both photogellable and photohardenable and may be used as such, depending on the amount of exposure at a predetermined range of wavelengths. Exposure to different wavelengths for which the composition has different sensitivities may also be used for this purpose. It is worth noting that low exposure may be attained not only by decreasing the time and/or intensity of the radiation, but also by distributing the radiation over the area to be exposed in the form of dots or lines or other patterns of varying size and distance between each other. For example, in the case of laser scanning, where good solidification of the composition may occur by overlapping the scanned lines, the overall exposure may be decreased and become suitable for gelation by increasing the distance between the lines adequately. The mass of the gel is not expected to be uniform, but it will be easily removable from the rest of the solidified-three dimensional object, and it will serve the purposes of this invention. The same is valid for breaking the lines into dots of suitable size and distance between each other in order to form a gelled mass of desirable consistency. A pattern of odd-sized spatter-like spots could also serve the same purpose, as long as the exposed areas form a gel-like, easily removable mass from the solidified three-dimensional object. It is not necessary to create the lines or dots or other patterns by scanning. Any mask having the desired line, dot, or other pattern configuration in conjunction with any projection system would serve the objectives of the instant invention very well. It is only important in this case, that the overall exposure is lowered in a way to produce a gel or easily removable mass from the rest of the three-dimensional object. In other words the gelled area may be produced by widely spaced scan lines or dots, in which exposure is adequate to solidify the lines or dots, but due to the small cross section of the lines or dots, there is only very weak cohesive strength between them, and thus the area is "gelled" simply by the fact that the lines act as loosely connected threads or islands, respectively, in a viscous liquid.

It is preferred that when the mechanism of the gel formation is carried out by lowering the exposure level, this lowering of exposure level is performed by using a line pattern. It is also preferable that within the gelled mass, the center axes of the lines corresponding to consecutive layers are immediately above each other so that vertical ribbon-like structures may be formed, wherein the bonds between lines in the vertical direction are stronger than the bonds between lines in the horizontal direction. This can be arranged easily by programming the scanning, and the projection. Since accurate registration of the gelled area is not necessary, the aforementioned arrangement is straightforward.

It is also preferable that a thin portion or barrier being subjected to very low or no exposutre is allowed at the interface between the gel and the three-dimensional object, to facilitate clean removal of the gel from the photohardened three dimensional object, and to promote better resolution.

Experiments were conducted wherein an object was fabricated by laser scanning and doctor knife coating means within a vat. The object started as a block at its base approximately 3" wide, 10 inches long, and 2 inches high. After the 2" height, the object had a plate shape of approximately 9" width, 10" long and 0.1" height. The plate was centered on the top of the block and overhung the block approximately 3" on either side of its length. The plate and block, which formed the integral object, were fabricated in 0.01" thick layers. On either side of the length of the block portion, was a gap of approximately 0.02" that separated the block from two gelled mass regions approximately 9.6" long and 3" wide. The outer periphery of the gelled regions (i.e. the periphery portions not abutting the gap and the block portion of the object) was enclosed by a wall of photohardened composition approximately 0.2" width. The object, the gelled mass, and the walls were imaged by scanning with a focused laser beam. Each layer of the block and the walls was scanned by a series of parallel lines drawn on the surface of the photohardenable composition with a distance of 0.002" between the lines. As such, all the composition between the lines was photohardened. In the region of the gelled mass, the scanning was performed using parallel lines, but the lines were approximately 0.030" apart. This distance between scan lines left the portions of the composition, between the scan lines, only slightly exposed and therefore a gelled or a tacky liquid. In this way, as each layer of gel was imaged, with the scan lines substantially in the same X-Y positions on the image plane, photohardened ribbons were produced which had some stability and stiffness due to their proximity to each other and the thickened viscosity of the composition between them. If the gel scan lines were brought closer together, or if higher exposure was utilized to image the lines, the gel mass would become stiff and solid. On the other hand, if the scan lines were spaced apart further, or if the exposure was decreased when imaging each line, the gel would be damaged when knife coated, or the gel would show signs of collapse as the gel height increased. The height of the gel region was approximately 1.99". Being the intent to provide a region of support beneath the overhang portions of the object, without the gel actually touching the overhangs or the object, the gel region layer just before the overhang was not imaged. The gel region was easily removable from the platform and the object but it adhered to the periphery wall. The overhang portions of the object were very smooth and showed no signs of distortion during fabrication. The gel mass separated from the overhang regions easily, however, there were slight signs of the ribbons on the undersurface. In this case, it is more preferred to not image the last two layers of the gel region (i.e. provide a two layer gap) beneath an overhang portion of an object in order to remove the signs of the gel ribbons on the overhang underside. Also it should be noted that the surface of the object layers after coating was very flat and did not exhibit any evidence of waves or other phenomena that normally occur, when doctor knife coating during fabrication of a three-dimensional object by Solid Imaging means, due to the presence of the gel on either side of the object during fabrication.

The apparatus of the preferred embodiment of this invention is illustrated in FIG. 1. Its elements and operation are described below.

There is provided an imaging station or means 70 including a radiation source 10, a modulator 14, a computer 34, a first exposure element 15, a second exposure element 16 and a third exposure element 17. There is also provided a coating station 80. Radiation means 10 is preferably a laser, producing a radiation beam 12. Being desirable to produce solid objects at high speed, the apparatus of the instant invention preferably utilizes relatively high power radiation means 10, such as a high power laser, which may have major bands in the visible, infrared, or ultraviolet regions. High power is considered to be a power greater than 20 mW, and preferably over 100 mW as measured from the intensity of radiation beam 12. This is so with the present photospeeds of photohardenable compositions. However, as faster compositions become available, the values of 20 mW and 100 mW for the beam intensity will become lower accordingly, since photospeed of the composition and intensity of the radiation beam have an inverse relation to each other in order to achieve the same results. The selection of a certain type of laser should be coordinated with the selection of the photohardenable composition in a way that the sensitivity of the photohardenable composition agrees reasonably well with the wavelength of the laser's emission. Other types of radiation means may also be utilized such as electron beams, x-rays, and the like, as long as their energy type is matched with the sensitivity of the photohardenable composition, a beam is provided, and the appropriate conditions for their handling are observed according to established ways, well known in the art. Although means may be provided to modify the shape of the beam cross-section to any desirable shape, the ordinary shape is circular, and the profile of the intensity of the beam is gaussian with a maximum at the center of the circular shape.

The radiation beam 12 passes through modulator 14, the modulator being preferably an acousto-optical modulator. The modulated radiation beam 12' passes in turn through the second exposure element 16, which comprises two mirrors 20 and 22, each mirror having an axis (not shown), allowing reflection of the beam towards the coating station 80 in the X and Y directions, the X and Y directions being perpendicular to each other. The mirrors 20 and 22 may rotatably move around their corresponding axes by means of motors 24 and 26, respectively for controllably deflecting the beam in a vector scanning mode, in the X and Y directions towards predetermined positions of the coating station 80, in which the photogellable and photohardenable composition is processed. Examples of suitable photohardenable compositions are given at a later section of this description.

As the beam is guided by the second exposure element 16, it assumes an acceleration from zero level to a maximum acceleration and a velocity from zero level to a maximum constant velocity. The velocity and the intensity of the beam remain proportional to each other, so that the exposure remains substantially constant. The beam exposes imagewise preselected portions of the composition to a substantially constant depth as described below.

For the purposes of this invention in general, the radiation beam 12" may be not only a focused beam from a laser, but also other light source or light, modified in a number of different ways. For example, it may be transmitted through any type of variable optical density photomask such as a liquid crystal display, silver halide film, electro-deposited mask etc., or reflected off of any variable optical density device, such as a reflective liquid crystal cell. In that respect, exposure elements 15 and 17 may also comprise or constitute such devices, or even be in the form of beams of actinic radiation.

As aforementioned, in the preferred embodiment, there is also provided a first exposure element 15 and a third exposure element 17. The function of the first exposure element 15 is to provide radiation in an imagewise form to the photohardenable composition, in a way that there is a soft gel formed around the article or object which is fabricated by photohardening the contiguous layers of the photohardenable composition by means of laser beam 12". The third exposure element 17 functions in a way to provide radiation imagewise to the periphery of the soft gelled area so that a wall is built around the soft gelled area. This wall, among other functions, prevents small fragments of the fragile gel to fall into the recirculated composition. The second exposure element 16 can be used by itself to perform all functions. However, by using only the second exposure element 16 which is preferably a scanner, the speed of forming the three dimensional object may be reduced considerably. It is, therefore, advantageous in many occasions to use a combination of exposure elements 15, 16, and 17, especially because elements 15 and 17 can provide a repeatable image layer after layer. In some occasions, elements 15 and 16 or elements 16 and 17, or even element 16 alone will be adequate for the purposes of this invention. The combined function of these elements will become much clearer as the description of the operation of this apparatus continues.

Figure 3:
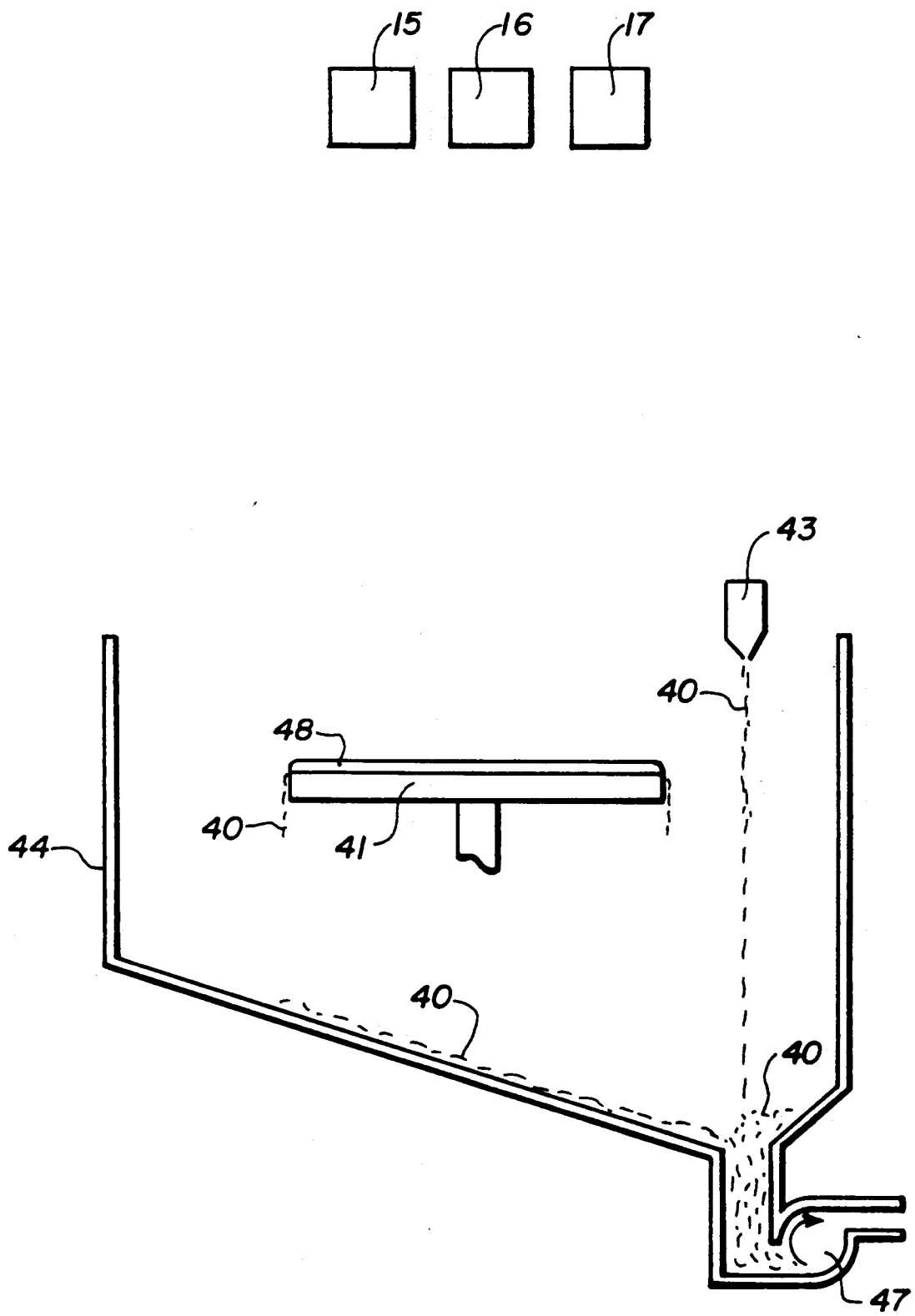
FIG. 3 is a schematic diagram of an enlarged view of the coating station shown in FIG. 1, including the first exposure element, second exposure element, and third exposure element.

FIG. 3, depicts in more detail the coating station 80 of the preferred embodiment of this invention.

Figure 4:
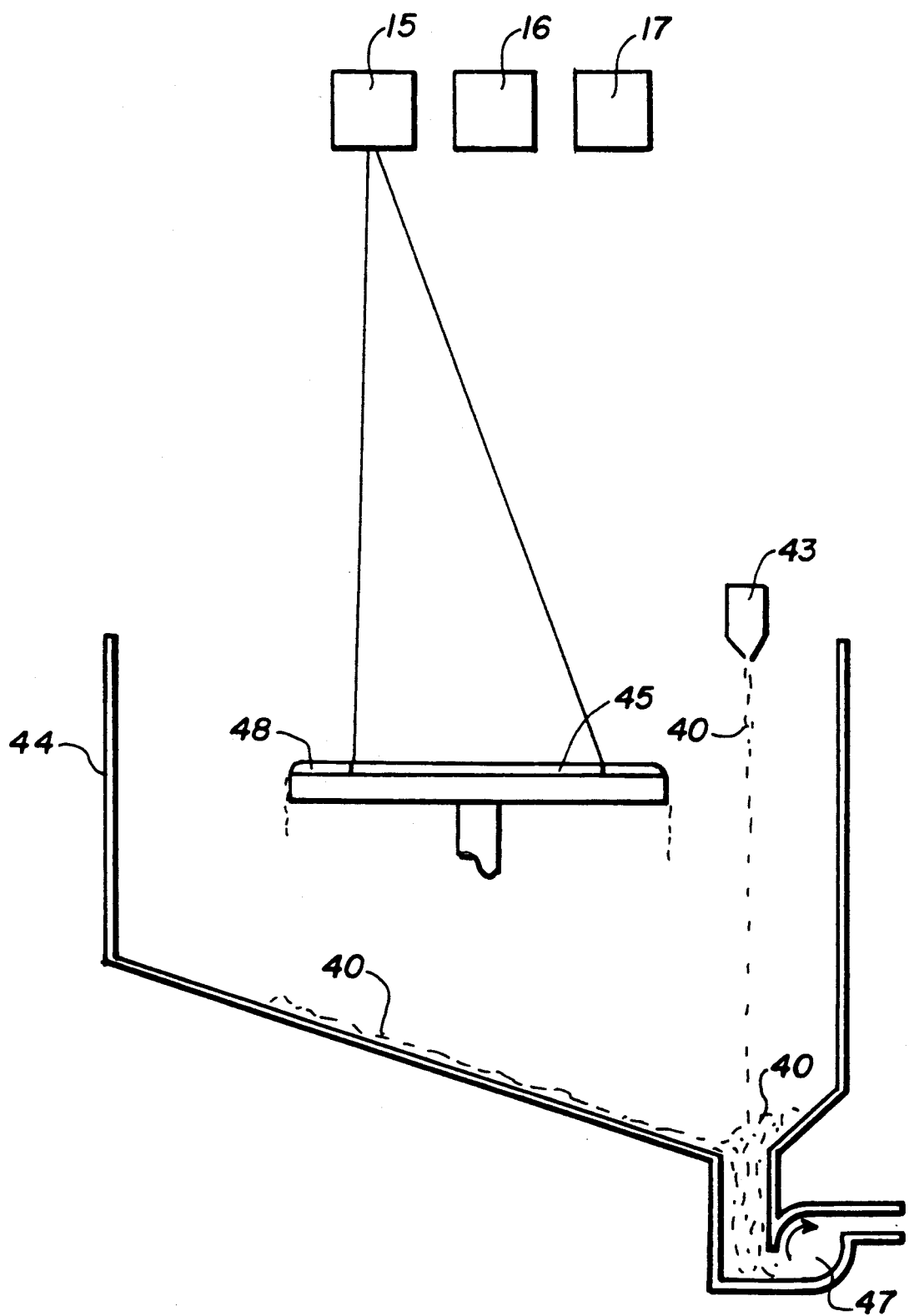
FIG. 4 is a schematic diagram showing the first exposure element exposing an area of a layer in the configuration of the preferred embodiment shown in FIG. 3.
Figure 5:
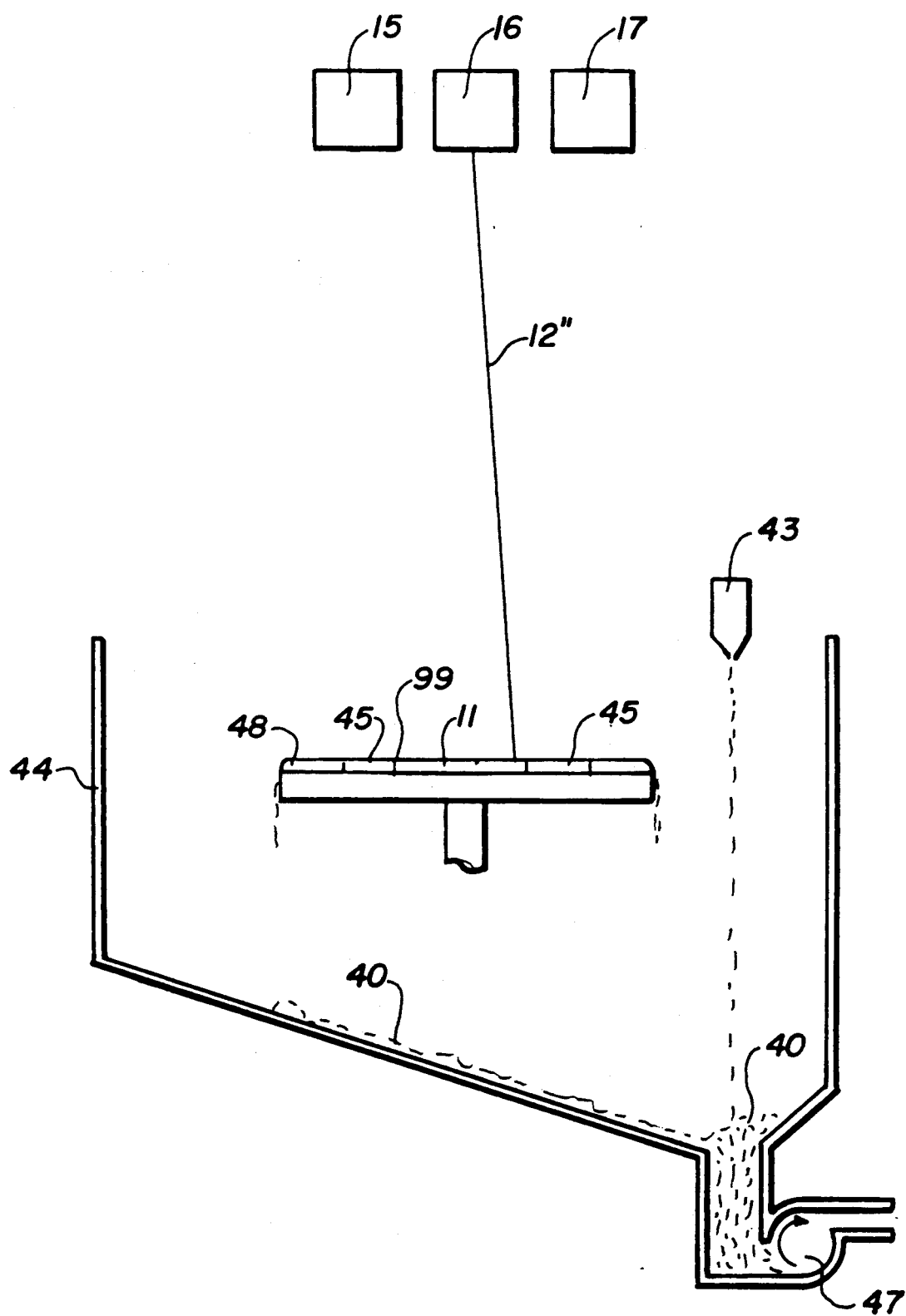
FIG. 5 is a schematic diagram showing the second exposure element exposing an area of a soft gelled portion in the configuration of the preferred embodiment shown in FIG. 4.

The coating station 80 comprises a vessel 44 which preferably has an inclined bottom portion for collecting the excess of composition 40, and a recirculation pump 47. Recirculation pump 47 can be replaced by any other means capable of recirculating the composition 40. Recirculation pump 47 causes the photohardenable and photogellable composition 40 to be carried into dispenser 43. Dispenser 43 reciprocates back and forth and in some occasions also sideways in order to deliver the liquid on a platform 41, which is substantially flat. The function of dispenser 43 is to provide layers of the composition. The dispenser may comprise such conventional mechanisms as curtain coaters, extruders, or sprayers. Other mechanisms of layer formation, of course, may be used. Due to the fact that only an area commensurate to the size of the three-dimentional object has to be coated according to the present invention, leveling and uniformity of each layer is accomplished in a fast rate as compared to other techniques, and there is no strict requirement for the dispenser to provide itself high uniformity to the layer in most instances, depending on the viscosity of the composition. Optionally, platform 41 may be supported by placement means 42 so that it can move up and down or in a translational manner sideways. This is not, however, necessary for the operation of the invention. Dispenser 43 provides a layer 48 of composition 40 on platform 41. A doctor blade (not shown for purposes of simplicity) may be used optionally to control better the thickness and uniformity of the layers. The first exposure element 15 provides a flood exposure in an image wise pattern to a portion 45 of layer 48, as shown in FIG. 4. This imagewise pattern may include a perspective portion of a cross sectional portion of the three dimensional object or it may be limited around it. In either case, it may be considered as surrounding the cross sectional portion. Thus an interface 99 is formed, shown better in FIGS. 5 and 6. The exposure given by element 15 is of such energy which is capable to produce soft gel 45. The beam 12" photohardens an area 11 surrounded by the soft gelled area 45.

The gelled mass surrounding the object need not actually be formed up to the edges of the object. It is preferable to form a thin region or barrier at the interface 99 of the gelled area and the three dimensional object by subjecting said thin region to only a fourth exposure equivalent to no or lower exposure than the first exposure. This thin region should be such in thickness and consistency as to provide adequate support to the object within the soft gelled area, depending on the properties of the composition, such as viscosity, viscoelasticity, tackiness, surface energy, photospeed, and the like. This configuration of a loose barrier ensures better object edge resolution and provides easier gel removal from the object during post processing.

Figure 2:
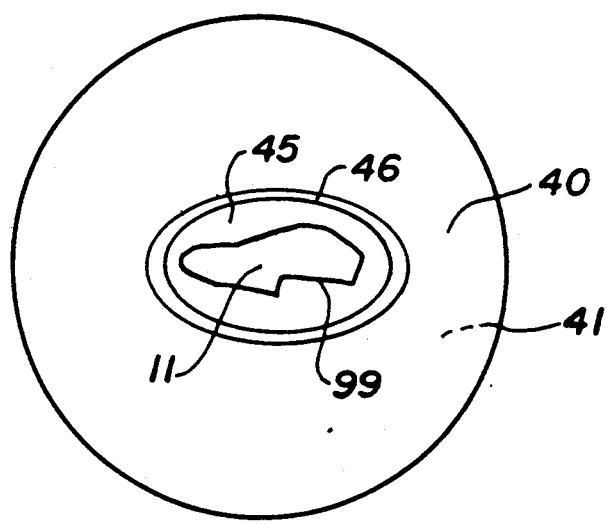
FIG. 2 illustrates an example of the top view of the preferred configuration in fabricating the three dimensional object, including a soft gelled mass around the object and a photohardened wall in the periphery of the soft gelled mass.
Figure 6:
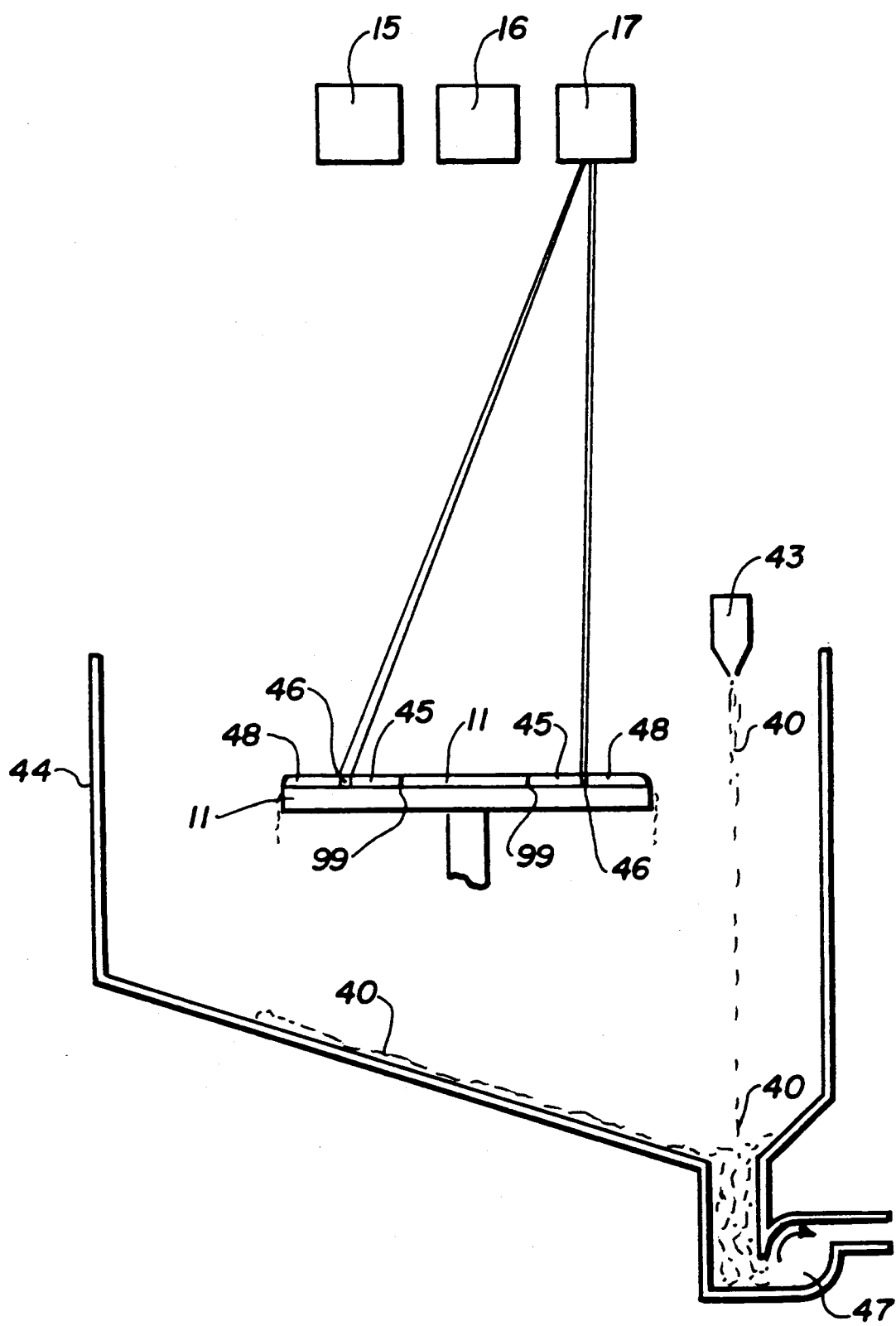
FIG. 6 is a schematic diagram showing the third exposure element exposing an area in the periphery of the soft gelled portion in the configuration of the preferred embodiment shown in FIG. 5.

Although any sequence, including simultaneous action, of exposure by elements 15, 16, and 17 may be used, it is preferable that the photohardening of the area corresponding to a respective cross sectional portion 11 of the three dimensional object takes place following the formation of the soft gelled area 45. This is because in consecutive layers, photohardening by beam 12" may also start in an isolated manner on the soft gelled mass alone, and not even be in contact with any other photohardened areas of any layers. This is important since it gives wider freedom in the design of a three dimensional object corresponding to more complicated structural designs. In addition, the soft gel provides a better substrate to accept a new layer of liquid composition, as compared to plain liquid under the new liquid layer. The third exposure element 17 provides an adequate radiation to photoharden areas 46, as shown in FIGS. 6 and 2, so that areas 46 are located in the periphery of the soft gelled area 45. The wall that is produced by the photohardened areas 46 is intended to include within it the soft gel areas 45, so that fragments of the soft gel will not fall in and impair the function of the recirculation of composition 40. After the two photohardening steps and the soft gel step have been carried out, dispenser 43 applies a new layer on top of the previously formed configuration. The same steps of soft gel formation, photohardening, and layer deposition are repeated until the object becomes complete. The wall is subsequently separated, for example by pulling it away from the object and breaking the weakly structured soft gel between the wall and the object. The rest of the soft gel is then removed preferably by mechanical means including spraying with a solvent which does not swell the photohardened portions, or by vibrations, or the like. Since in the preferred embodiment, photohardenable composition 40 comprises a thermally coalescible material, and more particularly a plastisol, a subsequent step of thermal treatment is desirable for the object to assume its ultimate strength.

It is worth mentioning that every time a layer is completed, placement means 42 moves the platform 41 down by the thickness of a layer. The platform may also be moved down more than the thickness of one layer to expedite liquid flow over previously exposed areas or the platform, and then moved back up to the one layer thickness position. However, instead of moving the platform 41, one can move accordingly the whole coating station 80 lower, or the assembly of the second exposure element 16 and the first and third exposure elements 15 and 17, respectively, or readjust the focus of these exposure elements. The height of dispenser 43 may also be readjusted to provide better layer uniformity.

Just one projection or other type of mask may be used by the first exposure element 15. Also, a single mask may be used by the third exposure element 17. Thus, the gel portion as well as the wall portion may very well be repeatable for each and every layer, during the fabrication of the three-dimensional object. Although this is desirable for simplicity purposes, it is not necessary, and sometimes it is desirable to change the shape of the soft gel and of the wall. For example, it may be desirable to minimize the area of the soft gel and the area within the wall in order to minimize the leveling time of each layer.

As shown in FIG. 1, communication lines 52, 50, 54, 60, 55, and 56 are also provided for computer 34 to control the radiation source 10, the modulator 14, the second exposure element 16, the placement means 42, the first exposure element 15, and the third exposure element 17, respectively, by methods well known to the art. The aforementioned doctor blade (not shown) may also be controlled by the computer 34. The graphic data corresponding to the shape of the solid object under production, are also stored in computer 34. The graphic data stored in computer 34, after being processed cause motors 24 and 26 to turn and move mirrors 20 and 22 accordingly in order to guide the radiation beam towards predetermined positions on the thin layer 48.

Although this method is not limited relative to layer thickness, it is preferable that layers of 30 mils or less be produced.

Figure 7:
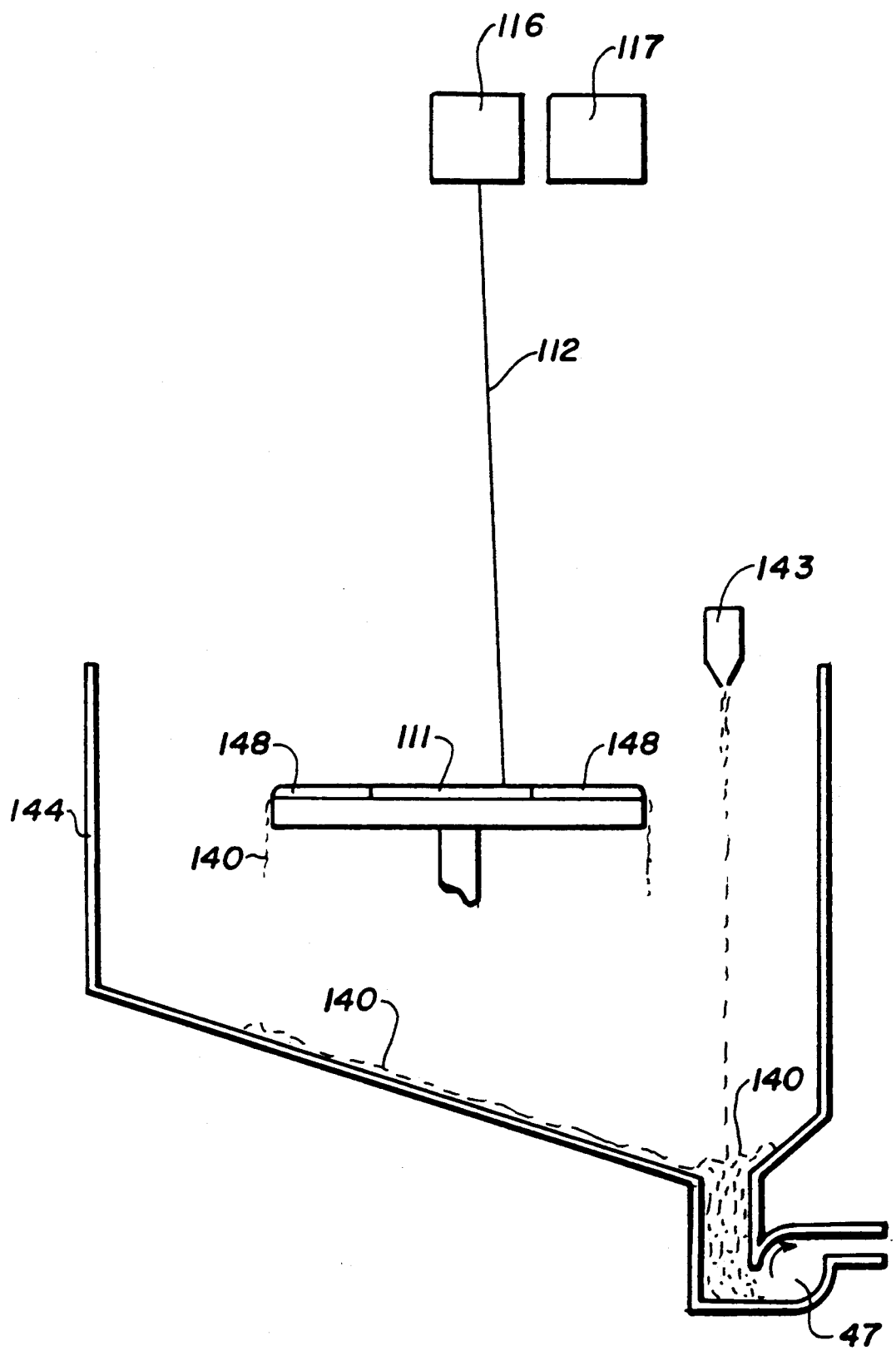
FIG. 7 is a schematic diagram of an enlarged view of the coating station shown in FIG. 1, including the second exposure element, and the third exposure element, but lacking the first exposure element, in a different embodiment of the instant invention. It also illustrates the second exposure element exposing a portion of a layer of the photohardenable composition.
Figure 8:
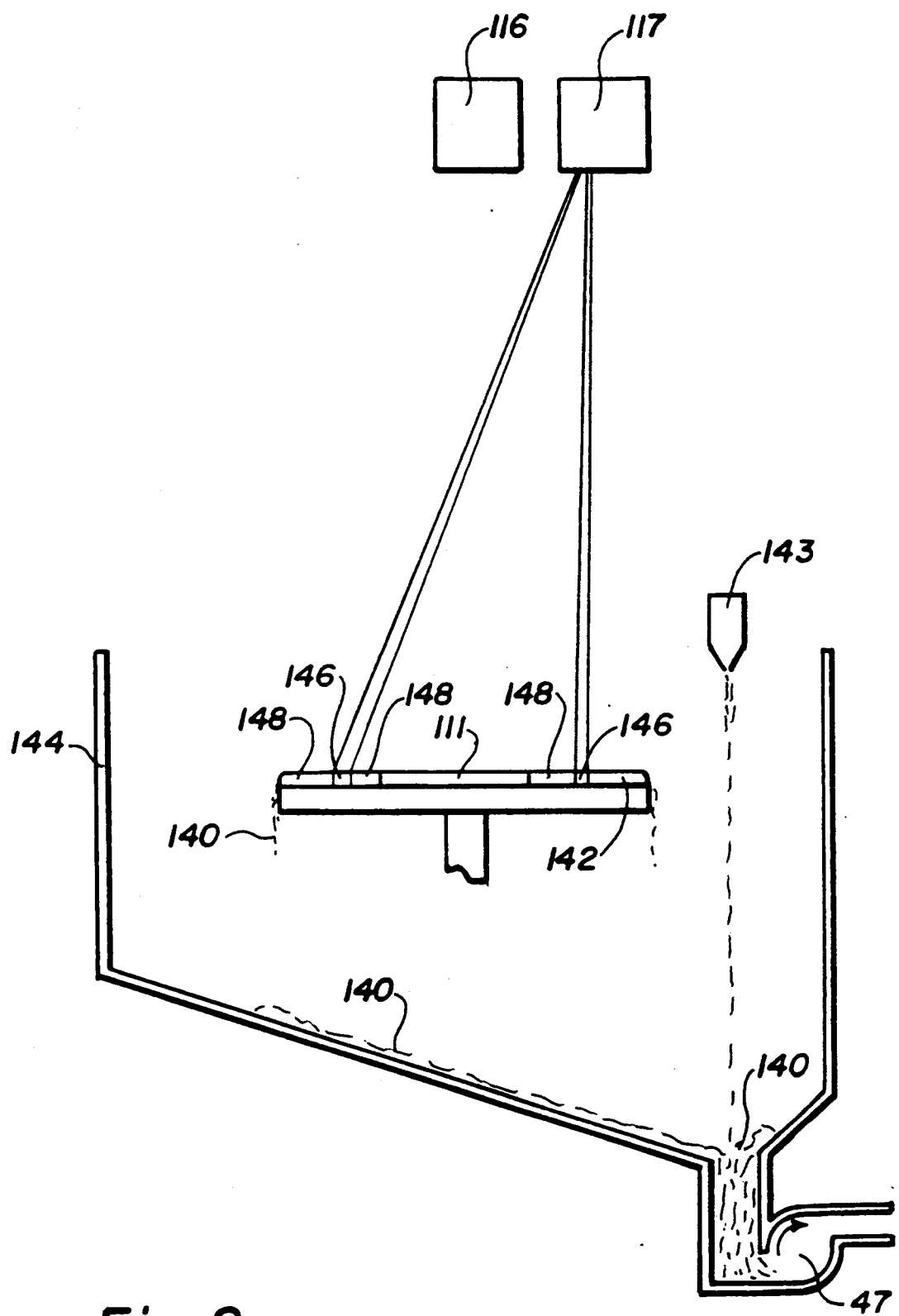
FIG. 8 is a schematic diagram showing the third exposure element exposing an area of a layer surrounding the area which was previously exposed by the second exposure element in the configuration of the embodiment shown in FIG. 7.

In another embodiment of this invention, illustrated in FIGS. 7 and 8, dispenser 143 provides a layer 148 of composition 140 on platform 141. No first exposure element is used. The second exposure element 116 photohardens an area of the layer corresponding to a cross sectional portion 111 of the three dimensional object. The third exposure element 117 provides an adequate radiation to photoharden area 146, as shown in FIG. 8, so that area 146 surrounds the respective cross sectional portion 111 of the three dimensional object. After the two photohardening steps have been carried out, dispenser 143 applies a new layer on top of the previously formed configuration, and optionally the aforementioned doctor blade (not shown) smoothes further the liquid layer. The same steps of photohardening, and layer deposition are repeated until the object becomes complete. The wall that is produced by the photohardened areas 146 is intended to form an automatically fabricated container of considerably smaller size than the size of vessel 144, so that the leveling process for each individually applied layer is considerably reduced. Every time a layer is completed, placement means 142 may move the platform 141 down by the thickness of a layer, or similar mechanisms as described in the preferred embodiment may be used.

In a different embodiment of the instant invention, no third exposure element is used, while the first exposure element and the second exposure element proceed with their functions as described above to produce a photohardened three dimensional object within a soft gel mass.

In still another embodiment of this invention, the first exposure element 15 may provide radiation of different and less effective wavelength regarding polymerization and/or cross linking of composition 40 than either element 16 or element 17.

In yet another embodiment, only exposure element 16 is used to produce the gel, the wall, the cross sectional area of the part, and if desired, the thin portion or barrier at the interface of the gelled mass and the three-dimensional object. The differences in exposure by element 16 for the various regions may be accomplished by modulation means 14 of beam 12″ and/or the scannning distance betwwn scan lines controlled by the second exposure element 16 itself, which is preferably a scanner. Both the scanner 16 and the modulation means are controlled in turn by computer 34. Referring to FIG. 1, the region 45 to be gelled receives a first exposure adequate to form a soft gel. Each cross sectional portion 11 of the three dimensional object and the wall 46, receive preferably about equal exposures to be photohardened. The barrier at the interface 99 receives a fourth exposure, the fourth exposure being the lowest of all including the case of no exposure at all. The first exposure may be achieved by increasing the distance between scan lines such that the photohardened lines are essentially individual lines that have no substantial stiffness in themselves but are somewhat constrained by relative motion by their proximity and the viscous nature of the surrounding liquid, or by creating dots loosely connected to each other, or by changing the wavelength of radiation beam 12, 12′, and 12″ through a filter, prism or reflective mirror coating means, such that the absorption of said wavelength creating polymerization inducing radicals is lower, and therefore less polymerization takes place per given volume. This embodiment is preferred when a fourth exposure is used at the interface of the three dimensional object and the soft gelled areas.

As already explained, the exposure elements 15, 16 and 17 may take the form of projectors, scanners, or combinations thereof, or they may be combined even in a single element. Of course the different versions will have advantages and disadvantages when compared to each other. Nevertheless, it is preferable that the first exposure element 15 and the third exposure element 17 constitute a first projector and a third projector, respectively, providing repeatable flood exposure in an imagewise manner, while in contrast, the second exposure element 16 is a scanner providing point by point exposure. As aforementioned, a line pattern in the form of ribbons would be the preferable way of reducing the exposure level at the areas to be soft gelled, according to the above description.

Although FIGS. 1 and 3 to 8 show a recirculation pattern for the photohardenable composition, the level of the composition 40 in vessel 44 might also be such as to cover the most recent photohardened cross sectional portion of the three dimensional object, as well as the respective gel and wall portions by the thickness of a layer. Then, it would be desirable for platform 41 to be adaptable to vertical movement for positioning the object suitably for the imagewise exposures.

During the practice of this invention, it has many times been convenient to simply provide regions of gel or solid beneath overhang portions of an object layer. An overhang portion should be understood to mean a portion of the object being fabricated in which the representative image layer of an object equals or exceeds the dimensions of the previous layer by a distance greater than the layer thickness. For example, if an object is being formed in 0.005″ thick layers and a previous object layer image is a one inch square, the next layer will produce an overhang if the object layer image is, for example, a 1.01″ (or greater) square. As such, overhangs will often be termed as cantilevers or beam sections. Such portions of an object usually rely upon the support of the previous layer, where that layer has the same X-Y coordinates in the image plane, and the portions' inherent stiffness for providing structural integrity. Under the usual process of fabricating objects by stereolithography or Solid Imaging means, these overhang portions of an object are often damaged or distorted, since typically there is only a low viscosity liquid beneath them which easily flows out from under the overhang portion The invention disclosed herein, however, places a region of gel or solid beneath these overhangs that aids in their support. There are also portions of an object, for example narrow wall portions, which do not have sufficient structural integrity to withstand the fabrication process. Placement of support regions near these object portions, with a gap between them, often allows the fabrication of such objects without substantial distortion.

Such regions need not be completely photogelled or photohardened. Indeed, in order to conserve photohardenable composition materials and to reduce exposure time, if laser scanning is used to provide the exposure for example, it is often preferable to make such regions hollow. If hollow support regions are used, it is important to build such support regions with adequate wall thickness and inherent structural rigidity in order to adequately support the object portions during the fabrication process.

In the case of a photogelled support region, and especially in the case of a photohardened support region, beneath the overhang, it is preferred to provide a gap between the region and the object. At first, it may seem that the gap, which preferably is filled with the photohardenable liquid composition, would not provide much support and therefore would allow, for example, the overhang portion of the object to distort during the fabrication process. However, if the gap is made thin, on the order of from 0.002″ to 0.03″, the viscosity of the composition becomes an important factor. Therefore, the liquid in the gap substantially resists motion and provides surprisingly substantial support to the overhang portion of the object during fabrication. This support is useful for preventing deflection of the overhang during such operations as coating, but also helps to reduce curl of the layers, and reduces the potential for portions of the object layer, having totally different X-Y coordinates from the previous object portion, from floating away. This is especially true when the gap area to overhang area ratio approaches one. For example, consider a cantilevered overhang portion which is 1″ square. If the gel or solid region beneath this overhang is simply a post or a web region of small X-Y cross-sectional area, the gap between the support and the overhang portion will also have a small cross-sectional area. For example, consider a web region under the overhang which is 0.1″ wide and 0.98″ long. Such a region forms a gap area of 0.098 square inches between the region and the overhang. This would yield a gap area to overhang area ratio of 0.098. Essentially the web region does not provide enough restriction to flow of the composition within the gap. Therefore, the cantilevered layer portion is likely to deflect. On the other hand if the gel or solid support region has dimensions of, for example, 1″ by 0.98″ beneath the overhang portion, the gap area will be 0.98 square inches, and the gap area to overhang area ratio will be 0.98, which closely approaches one. This also provides substantially more restriction area for the composition, within the gap, to flow through, and therefore will substantially reduce the deflection of the overhang portion. It is preferred that this gap area to overhang area ratio be at least 0.2, if placed in strategic regions such as near the sections of the overhangs where the maximum deflection would normally occur. But, it is more preferred that this ratio be closer to one in order to reduce the chances of object portion distortion. For the purposes of this invention, the calculation of gap area will be based upon the amount of gap area wherein the gap is 0.03" or less. It is important to note that the gap area is not necessarily a flat area, but that the gap area is often contoured in Solid Imaging applications. Also, the gap may be exposed to radiation that may entail substantially no direct exposure or, may provide adequate direct exposure to photogel the gap. It is important, however, that the photogel be separable from the object and that the gap exposure not substantially affect the accuracy of the object dimensions. Where a region is utilized to prevent, for example, a wall section from distorting, the gap area calculation will have the same criteria, however, the wall section area (the equivalent of the overhang area) should be calculated based upon the area of wall in need of support that exists on both sides of the wall.

In some cases, it is necessary to design the support regions in pieces like a puzzle, so that it is always possible to remove the support regions from around the object after fabrication. Where this is difficult, it may be preferable to create a support region that is a gel, such that the gel can be broken apart in sections of the object which would normally enclose or trap a solid support region. Producing a support region that is a solid in some sections and a gel in others may also prove advantageous.

For some applications, it has been preferred to construct a containment dike support region around a section beneath an overhang. The containment dike is separated from the overhang, and the rest of the object, by about 0.005–0.015 inches, and will typically will be fabricated approximately 0.03 inches above the lower portion of the overhang. The section directly beneath the overhang need not be exposed to form a solid or gel region since the liquid composition is substantially entrapped within the dike and therefore will aid in support of the overhang portion during the fabrication process.

Figure 9:
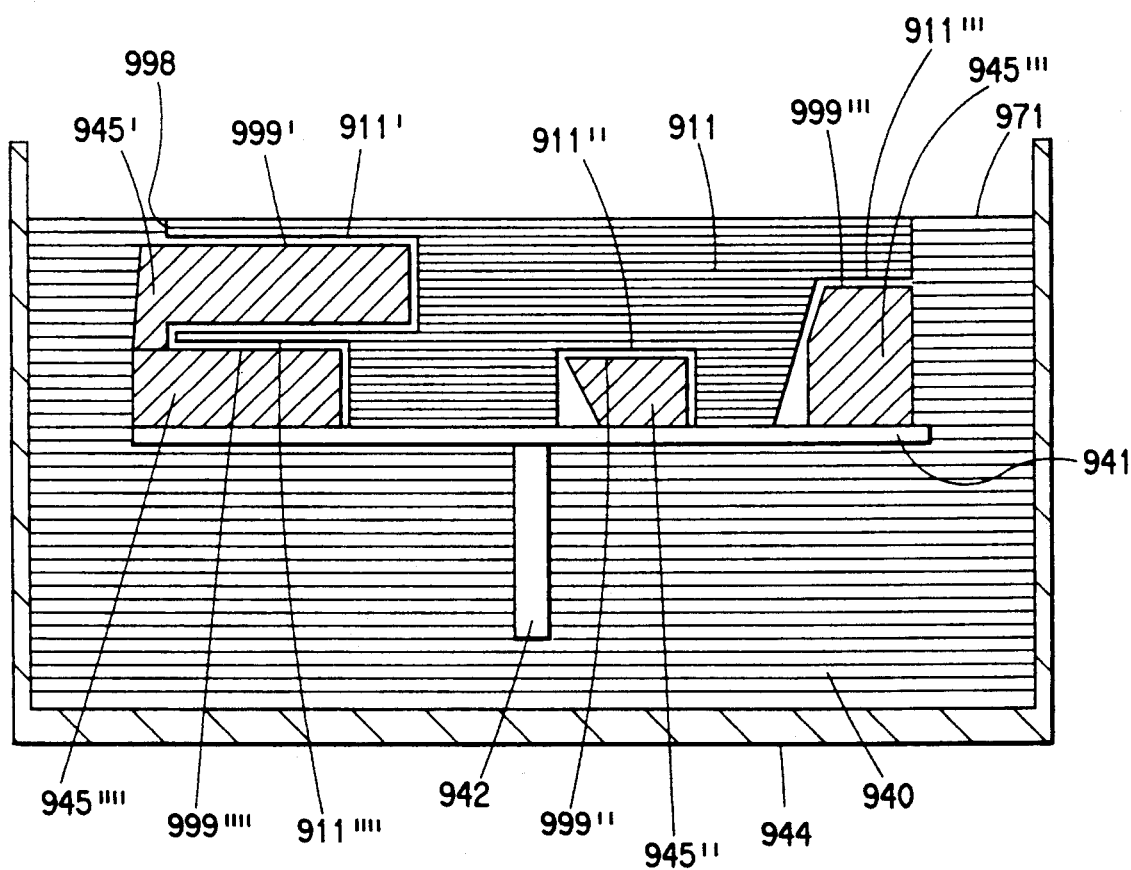
FIG. 9 is a schematic diagram showing various embodiments for providing support regions beneath overhanging portions of an object under fabrication using the present invention.

FIG. 9 depicts examples of the various approaches that may be utilized when providing gel or solid support regions beneath overhang portions of an object under fabrication by Solid Imaging means. The methods of coating and imaging are not shown, however, any method described in this disclosure may be used. It is more preferred, however, to utilize more conventional Solid Imaging or stereolithography practices wherein a vat 944 is used to contain a composition 940, which may be photogellable or photohardenable depending on the exposure method as described earlier in this disclosure. Within the vat 944 is a platform 941 adapted to be translated by translation means 942 relative to the composition surface 971. An object 911, having three cantilevered overhang portions 911', 911''', and 911'''' and one beam section portion 911'' is fabricated layer by layer on the platform 941. Also being fabricated layer by layer are photogelled, or more preferably, photohardened regions 945', 945'', 945''', and 945'''', which are separated from the object 911 and the overhang portions of the object 911 by gaps 999', 999'', 999''', and 999''''. The photohardened support region 945 segments are preferably imaged by laser scanning in the same manner that the object 911 layers are photohardened. Typically these regions 945 would be designed by the CAD designer in the same manner that the CAD designer uses to design the object 911. Preferably, the CAD designer would provide the gaps 999 such that, for a part being fabricated in 0.01" thick layers for example, the gap directly beneath the overhang portions 911', 911'', 911''', and 911''''would be approximately 0.02–0.03" thick, and the gap between the object 911 sides would be 0.015–0.02" wide. From there the CAD design would be placed in an .STL data format, then sliced into X-Y data sets representing thicknesses of the individual layers of the object 911, and then output to the scanner in HPGL format. Alternatively, the regions 945 could be imaged through a photomask or the like, or in any way convenient for the operator. The photohardened regions 945 need not conform in shape to the object 911 and need not necessarily surround the object 911. It is preferred, however, that the regions 945 provide as much area of support to the overhang portions 911', 911'', 911''', and 911'''''' as possible to prevent deflections of these portions. If the regions 945 are photogelled rather than photohardened, it may be necessary to provide a periphery wall (not shown) around the gelled regions 945 where the gel is not adjacent to a gap 999. As shown, if a double cantilever portion 911' and 911'''' is to be fabricated, two separate regions 945' and 945'''' may be needed for support. It is generally preferred to attach these two regions 945' and 945'''' together to ensure their integrity during fabrication. Preferably, if a small region (i.e. a region with a gap area to overhang area ration less than for example 0.5) is to be utilized to support an overhang portion, for example 911', the support region 945 should be placed in a position where the overhang portion 911' would normally have a maximum deflection point 998 in order to prevent distortion of this portion 911' during fabrication.

The photohardenable compositions which can be used in the practice of the instant invention are compositions which undergo solidification under exposure to an adequate dose of radiation. At low radiation levels, due to incomplete polymerization and/or cross linking, a soft gel is formed, which may be easily broken down by mechanical means. Thus, by providing different areas with different amounts of radiation, one may produce hard areas corresponding to layers which constitute part of the three dimensional object surrounded by a soft gelled mass. Such compositions comprise usually but not necessarily a photosensitive material and a photoinitiator. A similar effect may be produced by using combinations of monomers or oligomers, which undergo different degrees of polymerization and/or cross linking due to the relative amounts used, or to the different sensitivities at different wavelengths, or to the different types (for example cationic/free-radical), or the like, and combinations thereof. The word "photo" is used here to denote not only light, but also any other type of actinic radiation which may transform a liquid composition to a photohardened and solidified one by exposure to radiation. Cationic or anionic polymerizations, as well as condensation and free radical polymerizations and combinations thereof are examples of such behavior. It is only important that the types and amounts of oligomers or monomers, photoinitiators and other components in the composition are coordinated with the characteristics of the exposure elements 15, 16, and 17 in order to produce the desired results according to the teachings of the present invention. Any photopolymer formulator of ordinary skill in the art can tailor formulate such compositions without undue experimentation.

Photohardenable compositions containing thermally coalescible materials are of preference. A liquid thermally coalescible photohardenable composition is a composition which photohardens and solidifies upon exposure to actinic radiation without attaining necessarily its ultimate physical properties, particularly with respect to their adhesive and cohesive characteristics. However, it develops adequate integrity to be handled until such time when further treatment is provided. The composition is considered as coalescible when it comprises particulate matter in dispersed form, which particulate matter undergoes coalescence under a certain set of conditions, such as increased temperature for example. Coalescence is the transformation of a dispersed phase to a cohesive continuous solid phase.

Preferably the photohardenable composition comprises a thermally coalescible polymeric cohesive material, a photohardenable monomer, and a photoinitiator. Preferably the photohardenable material comprises an ethylenically unsaturated monomer. Upon exposure to the actinic radiation, even the exposed areas of the photohardenable composition must remain thermally coalescible after removing the unexposed areas. This is important to improve both adhesion in the joining surfaces between the layers and cohesion within the layers for a multilayer integral three dimensional object. Actually, cohesive bonds are formed at the joining surfaces by the thermally coalescible material providing superior properties to the structure of the final three dimensional object.

Although in the case of photohardenable compositions which are not based on coalescible materials, post treatment after the exposure is not always required, in the case where a coalescible material is an essential component of the formulation, further heat treatment is needed for the object to attain its ultimate strength. Thus in such cases, when all the layers of the three dimensional object have been formed by the method described above, the unexposed and the soft gelled portions of the composition may be removed by any conventional means, such as shaking the object, blowing gas towards the object, and the like. Further removal may be achieved by rinsing or spraying the object with poor, noncoalescing solvents. Water, alcohols, and in general polar solvents are poor solvents for nonpolar compositions and vice versa. As long as the solvent under consideration does not extract excessive amounts of materials from the photohardened area or it does not swell excessively the object to be rinsed within the rinsing time, it is considered to be a poor, noncoalescing solvent. The object then is thermally coalesced in order to develop high cohesive and adhesive strength. This step may be performed in an oven, such as convection, IR, microwave, and the like. Optimum temperature and time are dependent on the individual composition. Typically the temperature range is 100°-250° C. and the time range is 5-30 minutes. However, temperature and times outside these regions may be used.

A very important group of thermally coalescible materials are plastisols. Plastisols are fluid mixtures, ranging in viscosity from pourable liquids to heavy pastes, obtained by dispersing fine particle size polymeric resins in nonvolatile liquid thermal plasticizers, i.e., materials which are compatible with the polymer or resin and increase its workability and flexibility but have no substantial solvent activity for the resin or polymer under ordinary conditions of storage (e.g., room conditions). When the plastisol has been formed into a desired shape, e.g., by molding or coating, it can be heated to coalesce the polymeric resin particles and the nonvolatile liquid constituent, thereby forming a homogeneous solid mass. Volatile diluents can be added to plastisol dispersions to modify their viscosity and to achieve desirable handling characteristics in coating or other forming operations. A dispersion that contains no more than 10% volatile diluent is regarded as a plastisol. Since the plasticizer used in the case of plastisols acts as a plasticizer to solvate the polymer only at higher temperatures than storage temperatures, it may also be called thermal plasticizer.

The most widely used plastisols are based on polyvinyl chloride homopolymer in a plasticizer. Dispersion resins (particle size 0.1 to 2 micrometer range) are generally used. They are characterized by the polymer type (homopolymer or copolymer with vinyl acetate or polyvinyl chloride containing carboxyl functional groups) molecular weight and size, shape and distribution of particles. Resins of a given molecular weight are usually chosen according to the physical requirements of the finished product. High molecular weight resins yield higher physical strength. Copolymers are used when lower fusion temperature is required. Particle size, shape, and distribution have significant effect on plastisol rheology. Blending resin (particle size range 10-150 microns) may be incorporated with the dispersion resin. They usually have low oil absorption which reduces the viscosity of the plastisol at a given plasticizer level.

Polyvinyl chloride has been described in the literature as the primary polymer used in forming plastisols. Polyvinyl chloride plastisols have been described in U.S. Pat. No. 3,795,649 wherein the polyvinyl chloride is copolymerized with other monomers, including acrylic monomers, that constitute a minority (35%) of the polymer composition. In U.S. Pat. No. 2,618,621 there are disclosed polyvinyl chloride plastisols wherein part of the plasticizer content is replaced with an acrylic monomer, which is then conventionally thermally polymerized at the temperature encountered in the step of coalescing the polyvinyl chloride resin.

Polyvinyl chloride plastisol dispersions can be made photoactive by incorporating therein a photosensitive monomer and photoinitiator, such as described in U.S. Pat. No. 4,634,562, or by having attached to the backbone of the polyvinyl chloride polymer photopolymerizable or photocrosslinkable groups, such that upon exposure to actinic radiation, the modified polyvinyl chloride polymer becomes polymerized or crosslinked. Such compositions may be used, preferably as part of the total coalescible material, or as part or total of the unsaturated monomer. The photoinitiator may also constitute part of the polymer, as described for example in U.S. Pat. Nos. 4,251,618 and 4,276,366, and be employed by the present invention, preferably as part of the total coalescible material.

In general, polyvinyl halides, polyvinylidene halides, polyvinyl halide acetates, polyvinylidene halide acetates, polyphenylene oxide, polyvinyl acetal, and mixtures thereof may be used effectively as thermally coalescible polymers. It is preferable that the halide is chloride and or fluoride. Polyvinyl halide compositions usually include thermal stabilizers, well known in the art. Stabilizers have the ability to accept the hydrogen halide which is released from the polymer as a result of thermal degradation. They also prevent discoloration. Materials commonly used as stabilizers are the barium-cadmium-zinc types. They are frequently improved through addition of epoxidized oils and phosphates (chelates).

Polyelectrolyte compositions, such as described in U.S. Pat. No. 4,176,028, as well as acrylic and methacrylic plastisols, such as described in U.S. Pat. Nos. 4,421,619, 4,309,331, 4,465,572, 4,125,700 and Belgian Patent 865,180 may also be used. Other thermally coalescible compositions, such as those described in U.S. Pat. Nos. 4,523,983, 4,568,405, and 4,623,558 are also examples of compositions which may be employed in the practice of the present invention.

Plasticizers used in plastisols are generally categorized either by function or structure. Structurally, they may be classified as monomeric or polymeric, and functionally, as primary or secondary. Plasticizers which have good permanence, compatibility, and plasticizing efficiency are considered primary; less compatible ones are secondary. Typical nonpolymerizable plasticizers for polyvinyl chloride resins include but are not limited to: diisodecyl phthalate, diisononyl phthalate, diisooctyl phthalate, di-2-ethylhexyl phthalate, di-2-ethylhexyl azelate, diisodecyl adipate, n-octyl-n-decyl adipate, diisononyl adipate, di-2-ethylhexyl adipate, C7 and C9 adipate, n-C6-C8-C10 phthalates, n-octyl-n-decyl phthalates, ditridecyl phthalate, tri-2-ethylhexyl trimellitate, triisononyl trimellitate, n-octyl-n-decyl trimellitate, Polyester (Paraplex G-54, of Rohm & Haas Co., Plastolein 9750 of Emery Industries, Inc.), butyl benzyl phthalate, dihexyl phthalate, Butyl Octyl phthalate, Tricresyl phosphate, cresyl diphenyl phosphates, 2-ethylhexyl diphenyl phosphate, decyl diphenyl phosphate, dicapryl phthalate, di-2-ethylhexyl isophthalate, epoxide containing plasticizers such as epoxidized soybean oil, octyl epoxy tallate, and isooctyl epoxy tallate, hydrocarbons, chlorinated hydrocarbons and others.

Polymerizable plasticizers may be used together with nonpolymerizable plasticizers. They include but are not limited to 1,3-butylene glycol dimethacrylate, trimethylol propane bis-(methacrylate), trimethylol propane trimethacrylate.

Plasticizers have a profound effect in all aspects of plastisols including viscosity, rheological properties, storage ability, fusion temperature, application method, and ultimate physical properties (for example, tensile strength, % elongation, flame retardation and permanence after the thermal coalescing step). The importance of plasticizers in the case of plastisols is very high since they solvate the thermally coalescible material at an elevated temperature, and they become integral part of the final structure. Poor plasticizers may exude from the structure at a later time. Thus, they must be carefully considered in plasticizer selection for the particular polymer dispersion resin in question. Two or more plasticizers are commonly used in addition to the epoxide plasticizer since the epoxides give additional improvement in heat stability along with barium-cadmium-zinc stabilizers for polyvinyl chloride dispersion resins. Through proper combination of polymer dispersion resins and plasticizers, stabilizers, fillers, viscosity modifiers, etc., a wide range of properties may be attained upon thermal coalescence. For example, ultimate tensile and tear strength is obtained when using high molecular weight polymer resin, low amount of plasticizer, and sufficient processing time and temperature for complete fusion. To obtain increased elongation, increased amount of plasticizer and copolymer resin (i.e., vinyl chloride with 7% vinyl acetate copolymer) may be used. A desirable and important property plastisols impart to photohardenable formulations is lack of substantial shrinkage during the photohardening and fusion (thermal coalescing) step.

One or more monomers may be used in the composition. Monomers may be mono-, difunctional, trifunctional or multifunctional acrylates, methacrylates, vinyl, allyl, and the like. They may comprise other functional and/or photosensitive groups, such as epoxy, vinyl, isocyanate, urethane, and like, either by themselves if they are capable of rendering the monomer photohardenable, or in addition to acrylates or methacrylates.

Examples of suitable ethylenically unsaturated monomers which can be used alone or in combination with other monomers include but are not limited to t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S. Pat. No. 3,380,831, 2,2-di(p-hydroxyphenyl)-propane diacrylate, pentaerythritol tetraacrylate and tetramethacrylate, 2,2-di-(p-hydroxyphenyl)-propane dimethacrylate, triethylene glycol diacrylate, polyoxyethyl-2,2-di(p-hydroxyphenyl)propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxypropyl) ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Also included are all methacrylates, tetrahydrofurfuryl methacrylate, cyclohexyl methacrylate, diallylfumarate, n-benzylacrylate, Carbowax ® 550 acrylate, methyl Cellosolve ® acrylate, dicyclopentenyl acrylate, isodecyl acrylate, 2(2-ethoxyethoxy) ethylacrylate, poybutadiene diacrylate, tris (2-hydroxyethyl) isocyanurate triacrylate, epoxy diacrylate tetrabromo bisphenol A diacrylate. Monomers with vinyl group like vinyl pyrol, N-vinyl pyrrolidone and vinyl ethers are usable. Also, oligomers with mono or multifunctional groups such as the ones with carbon group for alkali removability, and the ones with both acrylate and isocyanate end groups are useful. Particularly preferred monomers are polyoxyethylated trimethylolpropane triacrylate, ethylated pentaerythritol triacrylate, dipentaerythritol monohydroxypentaacrylate and 1,10-decanediol dimethylacrylate. Others are caprolactone acrylates and methacrylates, propoxylated neopentyl glycol diacrylates and methacrylates.

Di-(3-acryloxy-2-hydroxypropyl) ether of bisphenol A and Di-(3-methacryloxy-2-hydroxypropyl) ether of bisphenol A oligomers, generally referred to as unsaturated bisphenol A oligomers are of particular interest because they provide higher photospeed; also urethane diacrylates and methacrylates with aliphatic or aromatic backbones, referred to as unsaturated urethane oligomers are of particular interest, because they provide both higher photospeed and higher flexibility.

Monomers which expand on polymerization can be used in part with the standard monomers to achieve compositions giving no shrinkage or warpage upon exposure. These monomers are based on polycyclic ring opening mechanisms. Spiro orthocarbonates, spiroorthoesters and bicyclic ortho esters are known to belong to this class. Typical monomers are norborene spiro orthocarbonate, and bismethylene spiro orthocarbonate. Monomers which undergo cationic polymerization are also useful in this invention. Representative classes of monomers are cyclic ethers cyclic formals and acetals, lactones, vinyl monomers, sulfur containing monomers, organosilicone monomers, monofunctional epoxies, difunctional epoxies, epoxy prepolymers and higher oligomers and epoxy end-capped silicone resins. They can be found in the open literature. One such reference is "Photoinitiated cationic polymerization" by James V. Crivello in "UV Curing: Science and Technology" edited by S. P. Pappas, published by Technology Marketing Corporation, 1978. Other ring opening monomers can be found in "Ring Opening Polymerization" Edited by K. J. Ivin and T. Saegusa, Elsevier Applied Science Publishers, London and New York, 1984.

Examples of photoinitiators which are useful in the present invention alone or in combination are described in U.S. Pat. No. 2,760,863 and include vicinal ketaldonyl alcohols such as benzoin, pivaloin, acyloin ethers, e.g., benzoin methyl and ethyl ethers, benzil dimethyl ketal; α-hydrocarbon-substituted aromatic acyloins, including α-methylbenzoin α-allylbenzoin and α-phenylbenzoin, others are 1-hydroxycyclobenzyl phenol ketone, diethoxyphenol acetophenone, 2-methyl-1-[4-(methyl thio)phenyl], 2-morpholino-propane-1, benzophenone, Michler's ketone, substituted triphenyl imidazolyl dimers with chain transfer agent camphoquinone etc. Photoreducible dyes and reducing agents disclosed in U.S. Pat. Nos. 2,850,445, 2,875,047, 3,097,096, 3,074,974, 3,097,097 and 3,145,104, as well as dyes of the phenazine, oxazine, and quinone classes, Michler's ketone, benzophenone, acryloxy benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators and photoinhibitors are sensitizers disclosed in U.S. Pat. No. 4,162,162. the photoinitiator or photoinitiator system is present in 0.05 to 10% by weight based on the total weight of the photohardenable composition. Other suitable photoinitiation systems which are thermally inactive but which generate free radicals upon exposure to actinic light at or below 185° C. include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tert-butylanthraquinone, octamethylanthraquinone, 1,4-naphthoquinone, 9,10-phenanthraquinone, benz(a) anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione. Also, alpha amino aromatic ketones, halogenated compounds like trichloromethyl substituted cyclohexadienones and triazines or chlorinated acetophenone derivatives, thioxanthones in presences or tertiary amines, and titanocenes.

Typical classes of initiators for cationic polymerization are aryldiazonium salts, diaryliodonium salts comprising nonnucleophilic counterions such as $SbF_6-$, $BF_4-$, $PF_6-$, $ClO_4-$, $CF_3SO_3-$, $AsF_6-$, triacylsulfonium salts, triarylselenium salts or Iron arene complex. Examples of these include but are not limited to 2,5-diethoxy-4-(p-tolylmercapto) benzene diazonium $PF_6-$, 4-dimethylamine-naphthalene diazonium $PF_6-$, diphenyliodonium hexafluoroarsenate, di-t-butyldiphenyliodonium hexaflurophosphate FX-512 sulfonium salt (by 3M Company), triethylsulfonium iodide, CG24-61 (by Ciba Geigy). One good reference book is Photoinitiation of Cationic Polymerization mentioned earlier.

Sensitizers useful with these photoinitiators for radical polymerization include but are not limited to methylene blue and those disclosed in U.S. Pat. Nos. 3,554,753; 3,563,750; 3,563,751; 3,647,467; 3,652,275; 4,162,162; 4,268,667; 4,351,893; 4,454,218; 4,535,052; and 4,565,769. A preferred group of sensitizers include the bis(p-dialkylaminobenzylidine) ketones disclosed in Baum et al., U.S. Pat. No. 3,652,275 and the arylyidene aryl ketones disclosed in Dueber, U.S. Pat. No. 4,162,162, as well as in U.S. Pat. Nos. 4,268,667 and 4,351,893. Useful sensitizers are also listed in Dueber, U.S. Pat. No. 4,162,162 column 6, line 1 to line 65. Particularly preferred sensitizers include the following: DBC, i.e., cyclopentanone, 2,5-bis-[4-(diethylamino)-2-methylphenyl]methylene]-; DEAW, i.e., cyclopentanone, 2,5-bis[4-(diethylamino)phenyl]methylene]-; dimethoxy-JDI, i.e., 1H-inden-1-one, 2,3-dihydro-5,6-dimethoxy-2-[(2,3,6,7-tetrahydro-1H,5H-benxo[i,j-]quinolizin-9-yl)methylene]-, and JAW, i.e., cyclopentanone, 2,5-bis[(2,3,6,7-tetrahydro-1H,5H-b-enzo[i,j-]quinolizin-1-yl)methylene]-. Also useful are cyclopentanone 2,5-bis[2-(1,3-dihydro-1,3,3-trimethyl-2H-indol-2-ylidene)ethylidene], CAS 27713-85-5; and cyclopentanone, 2,5-bis-[2-ethylanphtho[1,2-d]thiazol-2(1H)-ylidene)ethylidene], CAS 27714-25-6.

Sensitizers for cationic polymerization include but are not limited to perylene, acridine orange, acridine yellow, phosphene R, benzoflavin & Setoflavin T. Hydrogen donor compounds useful as chain transfer agents in the photopolymer compositions include: 2-mercaptobenzoxazole, 2-mercapto-benzothizole, 4-methyl-4H-1,2,4,triazole-3-thiol, and the like; as well as various types of compounds, e.g., (a) ethers, (b) esters, (c) alcohols, (d) compounds containing allylic or benzylic hydrogen cumene, (e) acetals, (f) aldehydes, and (g) amides as disclosed in column 12, lines 18 to 58 of MacLachlan, U.S. Pat. No. 3,390,996.

Other components may also be present in the photohardenable compositions, e.g., dyes, pigments, extenders, organic or inorganic fillers, organic or inorganic reinforcement fibers, polymerization inhibitors, thermal stabilizers, viscosity modifiers, interlayer and generally interfacial adhesion promoters, such as organosilane coupling agents, coating aids, etc., so long as the photohardenable compositions retain their essential properties as set forth above.

Although the applicants have herein disclosed specific preferred embodiments of the instant invention, the general scope of this invention is limited only by the appended claims and their equivalents.

What is claimed is:

1. A method for fabricating an integral three-dimensional object from a multiplicity of cross sectional portions of the object, the cross sectional portions corresponding to photohardened portions of contiguous layers of a photogellable and photohardenable liquid composition, comprising the steps of:
   (a) forming a layer of the photohardenable liquid composition;
   (b) providing a first exposure of actinic radiation to the layer, adequate to produce a soft gelled area, the soft gelled area surrounding a respective cross sectional portion of the object;
   (c) providing imagewise a second exposure of actinic radiation to the cross sectional portion of the object, adequate to imagewise photoharden said portion;
   (d) introducing a new layer of photohardenable liquid composition onto the layer subjected to steps (b) and (c);
   (e) repeating steps (b) to (d) until all layers of the three dimensional object have been photohardened and all soft gelled areas have formed a soft gelled mass surrounding the three dimensional object, the object being separated from the gelled mass by an interface; and
   (f) removing the soft gelled mass in order to recover the three dimensional object.

2. A method as defined in claim 1, further comprising the step of providing a third exposure of actinic radiation to the periphery of the gelled area, after step (a) and before step (d), the third exposure being adequate to photoharden a complete sector of a circumferencial wall, the wall being built to contain the gelled area.

3. A method as defined in claim 1, wherein the first exposure of step (b) is repeatable flood exposure.

4. A method as defined in claim 2, wherein the first exposure is repeatable flood exposure.

5. A method as defined in claim 2, wherein the third exposure is repeatable flood exposure.

6. A method as defined in claim 1 or 2, further comprising the step of providing a fourth exposure of actinic radiation at the interface of the object and the gelled area, said fourth exposure being lower than the first exposure.

7. A method as defined in claim 1 or 2, wherein the layers are formed by curtain coating.

8. A method as defined in claim 1 or 2, wherein the layers are formed by extrusion.

9. A method as defined in claim 1 or 2, wherein the layers are formed by spraying.

10. A method as defined in claim 1 or 2, wherein the layers are leveled by doctoring.

11. A method as defined in claim 1 or 2, wherein the photohardenable composition comprises a plastisol.

12. A method as defined in claim 11, further comprising the step of heat treating the three dimensional object.

13. A method for fabricating an integral three-dimensional object from a multiplicity of cross sectional portions of the object, the cross sectional portions corresponding to photohardened portions of contiguous layers of a photohardenable liquid composition, comprising the steps of:
   (a) forming a layer of the photohardenable liquid composition;
   (b) forming a complete sector of a peripheral wall of photohardened composition around the respective cross sectional portion of the three-dimensional object by first exposing said complete sector of the peripheral wall to radiation by flood exposure;
   (c) providing imagewise a point-by-point exposure of actinic radiation to the cross sectional portion of the object, adequate to imagewise photoharden said cross sectional portion;
   (d) introducing a new layer of photohardenable liquid composition onto the layer subjected to steps (b) and (c); and
   (e) repeating steps (b) to (d) until all layers of the three dimensional object and all sectors of the peripheral wall have been photohardened.

14. A method as defined in claim 13, wherein the layers are formed by curtain coating, 15. A method as defined in claim 13, wherein the layers are formed by extrusion.

16. A method as defined in claim 13, wherein the layers are formed by spraying.

17. A method as defined in claim 13, wherein the layers are leveled by doctoring.

18. A method as defined in claim 13, wherein the photohardenable composition comprises a plastisol.

19. A method as defined in claim 18, further comprising the step of heat treating the three dimensional object.

20. A method of fabricating a three-dimensional object comprising the steps of:
   (a) forming a layer of photohardenable liquid composition;
   (b) providing imagewise a first exposure of actinic radiation to the layer, said first imagewise exposure representing a respective cross-sectional portion of the object, and said first imagewise exposure adequate to photoharden the portion imagewise;
   (c) providing a second imagewise exposure of actinic radiation to the layer, said second imagewise exposure representing a respective cross-sectional segment of a support region, said second imagewise exposure being adequate to photoharden the segment imagewise, and said segment being separated from the object portion by a gap;
   (d) forming a new layer of photohardenable liquid composition on the layer subjected to steps (b) and (c);
   (e) repeating steps (b) through (d) until all portions of the object and all segments of the regions have been formed.

* * * * *